C. A. INTRUP.
PLOW.
APPLICATION FILED JUNE 14, 1911.
1,025,066.
Patented Apr. 30, 1912.
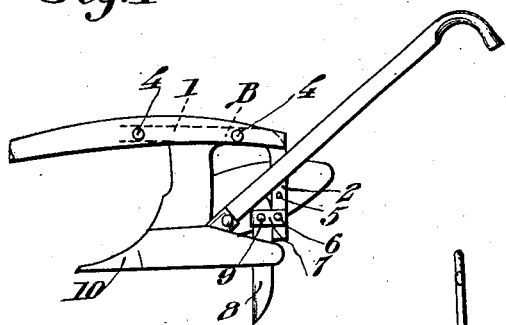
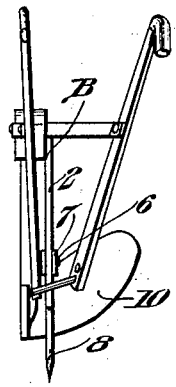
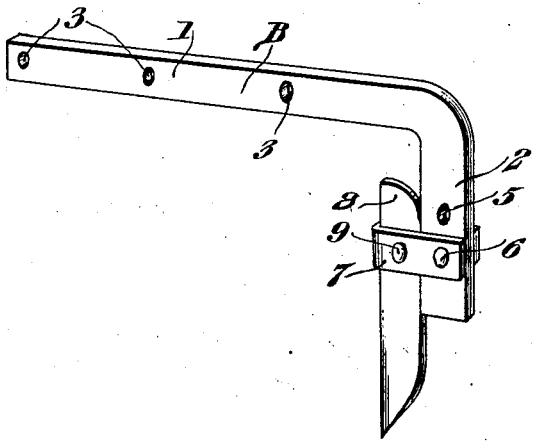
Inventor
Charles A. Intrup
Witnesses
By Victor J. Evans
Attorney

UNITED STATES PATENT OFFICE.

CHARLES A. INTRUP, OF WILBURN, VIRGINIA.

PLOW.

1,025,066.   Specification of Letters Patent.   Patented Apr. 30, 1912.

Application filed June 14, 1911. Serial No. 633,094.

*To all whom it may concern:*

Be it known that I, CHARLES A. INTRUP, a citizen of the United States, residing at Wilburn, in the county of Lunenburg and State of Virginia, have invented new and useful Improvements in Plows, of which the following is a specification.

This invention relates to plows, and it has particular reference to sub-soiling attachments.

The object of the present invention is to produce a simple, inexpensive and thoroughly effective sub-soiling attachment which may be readily applied to a plow of ordinary construction for the purpose of forming an incision in the bottom of the furrow formed by the plow, thereby stirring and breaking the soil and permitting moisture to gather, thereby promoting the germination and growth of seeds subsequently planted.

A further object of the invention is to produce a sub-soiling attachment equipped with a cutting blade which may be easily adjusted for the purpose of cutting into the soil at the requisite depth and which, when required, may be readily detached.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a side elevation of a plow equipped with the improved sub-soiling attachment. Fig. 2 is a rear elevation of the same. Fig. 3 is a perspective view, showing the improved device detached.

Corresponding parts in the several figures are denoted by like characters of reference.

B designates a substantially L-shaped flat metal bar having a relatively long arm 1 and a relatively short arm 2, said arms being disposed at a substantially right angle to one another, the corner being preferably rounded, as shown. The long arm 1 is provided with apertures 3 for the passage of fastening members, such as bolts 4, whereby it may be secured in a substantially horizontal position upon the side of any plow beam of ordinary construction, such beam being provided with apertures for the passage of the fastening members. The relatively short arm 2 which, when the device is mounted in position for operation, extends vertically in a downward direction at the rear end of the plow beam, is provided with apertures 5 for the passage of fastening members 6 serving to retain in position a clip or keeper 7 that extends forwardly of the arm 2 and serves to retain in position the sub-soiling cutter 8 which may be secured by means of a bolt 9. The cutter 8 which, as will be seen, consists of a flat blade of a thickness which does not exceed the thickness of the arm 2, may project any desired distance below the bottom of the furrow which is formed by the plow 10 upon the beam 11 of which the device is mounted.

The sub-soiling cutter is preferably supported in rear of and adjacent to the landside of the plow, and it will be understood that by changing the position of the clip or keeper 7, the said cutter may be adjusted so as to penetrate the soil to the requisite depth. At any adjustment the back of the blade 8 will engage and be supported by the forward edge of the arm 2, and it will be seen that in operation the blade 8 will simply form a narrow incision at the bottom of the furrow, as though made by a knife blade, which while effective to cut roots and to form a channel in which moisture may accumulate, will not greatly obstruct the progress of the plow or increase the draft.

The improved sub-soiling attachment, as will be seen from the foregoing description, is extremely simple in construction, and it has been found thoroughly effective in operation. It may be easily and quickly applied to a plow of any ordinary type, and when thus applied, it has been found that the plow may be operated with an increase in the draft which is so slight as to be barely noticeable. On the other hand it has been found that by the operation of the sub-soiling attachment the ground is worked and prepared in a superior and far more effective manner than by a plow unprovided with the attachment.

Having thus described the invention, what is claimed as new, is:—

A subsoiling attachment for plows comprising a flat approximately L-shaped bar having a long and a short arm, the latter arm being vertically disposed, a keeper connected with the short arm and extending horizontally beneath the long arm, and a subsoiling cutter consisting of a flat blade of a thickness not exceeding that of the vertical arm, said blade being mounted in the keeper with its back in contact with the forward edge of the short arm.

In testimony whereof I affix my signature in presence of two witnesses.

CHARLES A. INTRUP.

Witnesses:
ETHEL A. BELL,
IDA CROWDER.

---

Copies of this patent may be obtained for five cents each, by addressing the "Commissioner of Patents, Washington, D. C."